(12) United States Patent
Gu et al.

(10) Patent No.: US 9,819,956 B2
(45) Date of Patent: Nov. 14, 2017

(54) HIGH DYNAMIC RANGE ADAPTATION OPERATIONS AT A VIDEO DECODER

(71) Applicant: ARRIS Enterprises LLC, Suwanee, GA (US)

(72) Inventors: Zhouye Gu, San Diego, CA (US); Koohyar Minoo, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/274,653

(22) Filed: Sep. 23, 2016

(65) Prior Publication Data

US 2017/0085895 A1  Mar. 23, 2017

Related U.S. Application Data

(60) Provisional application No. 62/222,715, filed on Sep. 23, 2015.

(51) Int. Cl.
| | | |
|---|---|---|
| H04N 19/44 | (2014.01) | |
| H04N 19/46 | (2014.01) | |
| H04N 19/136 | (2014.01) | |
| H04L 29/06 | (2006.01) | |
| G06T 5/00 | (2006.01) | |

(Continued)

(52) U.S. Cl.
CPC ............ *H04N 19/44* (2014.11); *G06T 5/009* (2013.01); *H04L 65/607* (2013.01); *H04N 19/136* (2014.11); *H04N 19/46* (2014.11); *G06T 2207/10016* (2013.01); *G06T 2207/20208* (2013.01)

(58) Field of Classification Search
CPC .......... H04N 5/20; H04N 19/44; H04N 19/46; H04N 19/70; H04N 19/136; G06T 5/009; G06T 5/10
See application file for complete search history.

(56) References Cited

U.S. PATENT DOCUMENTS

2015/0248747 A1* 9/2015 Atkins ...................... G06T 5/10
345/589
2015/0271509 A1   9/2015 Minoo et al.
(Continued)

FOREIGN PATENT DOCUMENTS

| WO | 2014/130343 A2 | 8/2014 | |
|---|---|---|---|
| WO | WO 2014130343 A2 * | 8/2014 | ............... H04N 5/20 |
| WO | 2014/178286 A1 | 11/2014 | |

OTHER PUBLICATIONS

PCT Search Report & Written Opinion, RE: Application No. PCT/US2016/053531, dated Dec. 19, 2016.

(Continued)

*Primary Examiner* — Obafemi Sosanya
(74) *Attorney, Agent, or Firm* — Lori Anne D. Swanson

(57) ABSTRACT

A method of decoding a bitstream comprising decoding the bitstream into color values and metadata items indicating information about adaptive post-processing operations performed by a decoder, performing high dynamic range (HDR) adaptation operations on the color values based on the metadata items, and performing fixed post-processing operations to reconstruct an HDR video from the color values, wherein the HDR adaptation operations convert color values into a format expected by the fixed post-processing operations.

14 Claims, 5 Drawing Sheets

(51) Int. Cl.
*H04N 5/20* (2006.01)
*H04N 19/70* (2014.01)
*G06T 5/10* (2006.01)

(56) References Cited

U.S. PATENT DOCUMENTS

2016/0080714 A1* 3/2016 Tsukagoshi ............ H04N 19/70
 348/453
2016/0316207 A1 10/2016 Minoo et al.
2016/0316215 A1 10/2016 Minoo et al.

OTHER PUBLICATIONS

A. Segall, et al., "Tone mapping SEI", 19th JVT Meeting, Mar. 21-Apr. 7, 2006, Geneva (Joint Video Team of ISO/IEC JTC1/SC29/WG11 and ITU-T SG.16) No. JVT-S087, Apr. 1, 2006, pp. 2-8.
S. Lasserre, et al., Technicolor's response to CfE for HDR and WCG (category 1), 112th MPEG meeting Jun. 22-26, 2015, Warsaw, (Motion Picture Expert Group or ISO/IEC JTC1/SC29/WG11), Jun. 21, 2015, figure 6.
K. Minoo, et al. "System for coding High Dynamic Range and Wide Color Gamut sequences," filed Jul. 22, 2016.

* cited by examiner

HIGH DYNAMIC RANGE ADAPTATION OPERATIONS AT A VIDEO DECODER

CLAIM OF PRIORITY

This Application claims priority under 35 U.S.C. §119(e) from earlier filed U.S. Provisional Application Ser. No. 62/222,715, filed Sep. 23, 2015, which is hereby incorporated by reference.

TECHNICAL FIELD

The present disclosure relates to the field of video encoding and decoding, particularly a method of converting decoded values into a format expected by later operations that generate reconstructed high dynamic range (HDR) video.

BACKGROUND

Video sequences with color values in a High Dynamic Range (HDR) video and/or Wide Color Gamut (WCG) offer greater ranges of luminance and color values than traditional video with color values in a standard dynamic range (SDR) and/or a narrower color gamut. For example, traditional SDR video can have a limited luminance and color range, such that details in shadows or highlights can be lost when images are captured, encoded, and/or displayed. In contrast, HDR video can capture a broader range of luminance and color information, allowing the video to appear more natural and closer to real life to the human eye.

Encoders can encode an HDR video into a bitstream using a coding format such as HEVC (High Efficiency Video Coding) or AVC (Advanced Video Coding). Encoders can process an HDR video's original color values prior to encoding the bitstream. Such pre-processing can improve coding efficiency and/or make the values compatible with a particular coding format. The bitstream can then be delivered to a decoder such that it can be decoded and displayed to viewers on a television or other monitor. When pre-processing operations were performed on HDR video by the encoder, decoders can use post-processing operations following decoding to reverse the encoder's pre-processing operations and reconstruct the HDR video from decoded values.

Improved techniques for identifying such post-processing operations and preparing decoded values for post-processing operations is desired.

SUMMARY

The present disclosure provides a method of decoding a bitstream, the method comprising receiving a bitstream at a decoder, decoding the bitstream with the decoder into color values and metadata items indicating information about adaptive post-processing operations to be performed by the decoder, performing, with the decoder, one or more high dynamic range (HDR) adaptation operations on the color values based on the metadata items, and performing, with the decoder, one or more fixed post-processing operations to reconstruct an HDR video from the color values, wherein the one or more HDR adaptation operations convert the color values into a format expected by the one or more fixed post-processing operations.

The present disclosure also provides a video decoder comprising a data transmission interface configured to receive a bitstream, and a processor configured to decode the bitstream into color values and metadata items indicating information about adaptive post-processing operations to be performed by the processor, perform one or more high dynamic range (HDR) adaptation operations on the color values based on the metadata items and perform one or more fixed post-processing operations to reconstruct an HDR video from the color values, wherein the one or more HDR adaptation operations convert the color values into a format expected by the one or more fixed post-processing operations, and wherein the one or more HDR adaptation operations convert the color space of the color values, convert the bit depth of the color values, and/or change a transfer function by which the color values are adjusted.

BRIEF DESCRIPTION OF THE DRAWINGS

Further details of the present invention are explained with the help of the attached drawings in which.

DETAILED DESCRIPTION

Figure 1:
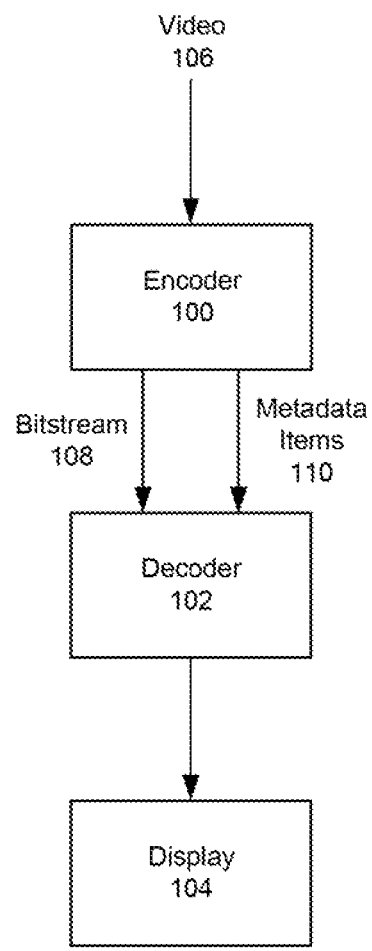
FIG. 1 depicts an exemplary embodiment of a video system comprising an encoder and a decoder coupled with a display.

FIG. 1 depicts an embodiment of a video system comprising an encoder 100 and a decoder 102 coupled with a display 104. The encoder 100 can receive a video 106 and generate a bitstream 108 and metadata items 110 from elements of the video 106, including its image essence. A video's image essence can be an ordered sequence of images, such as a sequence of frames or pictures. The bitstream 108 and metadata items 110 generated by the encoder 100 can be provided to a decoder 102 over the internet, over a digital cable television connection such as Quadrature Amplitude Modulation (QAM), or over any other digital transmission or delivery mechanism. A decoder 102 can use the bitstream 108 and metadata items 110 to decode and output a reconstructed version of the video 106 for playback on the display 104. The display 104 can be a television, monitor, device screen, or any other type of display configured to present reconstructed video 106.

An encoder 100 can comprise processors, memory, circuits, and/or other hardware and software elements configured to encode, transcode, and/or compress elements of a video 106, such as its image essence, into a bitstream 108. The encoder 100 can be configured to generate the bitstream 108 according to a video coding format and/or compression scheme, such as HEVC (High Efficiency Video Coding), H.264/MPEG-4 AVC (Advanced Video Coding), or MPEG-2. By way of non-limiting examples, an encoder 100 can be a Main 10 HEVC encoder or an AVC High 10 profile encoder.

Similarly, a decoder 102 can comprise processors, memory, circuits, and/or other hardware and software elements configured to decode, transcode, and/or decompress a bitstream 108 into a reconstructed video 106. A decoder 102 can be configured to decode a bitstream 108 according to a video coding format and/or compression scheme, such as HEVC, H.264/MPEG-4 AVC, or MPEG-2. By way of non-limiting examples, a decoder 102 can be a Main 10 HEVC decoder or an AVC High 10 profile decoder.

In some embodiments, the encoder 100 and/or decoder 102 can be dedicated hardware devices. In other embodiments the encoder 100 and/or decoder 102 can be, or use, software programs running on other hardware such as servers, computers, or video processing devices. By way of a non-limiting example, an encoder 100 can be a video encoder operated by a video service provider, while a decoder 102 can be part of a set top box, such as a cable box, connected to a television or other display 104. In some embodiments, a decoder 102 and display 104 can be integrated into a single device.

In some embodiments or situations the video 106 provided to the encoder 100 can be a high dynamic range (HDR) video 106. An HDR video 106 can have luminance values within a high dynamic range (HDR) and/or chromaticity values within a wide color gamut (WCG), relative to video 106 with values in a smaller standard dynamic range (SDR) and/or standard color gamut (SCG). By way of a non-limiting example, HDR video 106 can have a higher ratio of maximum visible brightness to minimum visible brightness compared to SDR video 106. As such, HDR video 106 can include a larger range of colors and details than SDR video 106, such as increased levels of perceptible shadow and/or highlight detail.

When the video 106 provided to the encoder 100 is an HDR video 106, the encoder 100 can use one or more pre-processing operations to convert color values from the HDR video 106 prior to encoding them into a bitstream 108 to increase coding efficiency, convert the values into a form that can be encoded using a desired encoding scheme, and/or any other reason. By way of a non-limiting example, in some embodiments color values for an HDR video 106 can be provided in a high bit depth format, such as an EXR file format with RGB color values expressed in a linear light RGB domain using a 16-bit floating point value for each color channel including a red channel, a green channel, and a blue channel. As such, the encoder 100 can convert the 16-bit values in the HDR video 106 into 10-bit values that can be encoded using a 10-bit HEVC profile. By way of another non-limiting example, the encoder 100 can also convert the color values from an RGB color primary to the YCbCr color space, as YCbCr values can often be encoded using fewer bits then RGB values.

When the encoder 100 converts color values using one or more operations prior to encoding them into a bitstream 108, a decoder 102 can first decode the bitstream 108 and then perform one or more corresponding inverse operations that substantially reverse the encoder's operations in order to reconstruct the HDR video 106. Information about the operations taken by the encoder 100 prior to encoding the bitstream 108 can be provided to decoders 102 in metadata items 110, such that the decoder 102 can identify and perform corresponding inverse operations from the metadata items 110 when reconstructing the HDR video 106. When the decoder 102 is configured with fixed inverse operations, decoders can use HDR adaptation operations based on the metadata items 110 to convert decoded values into an expected format prior to the fixed inverse operations.

Figure 2:
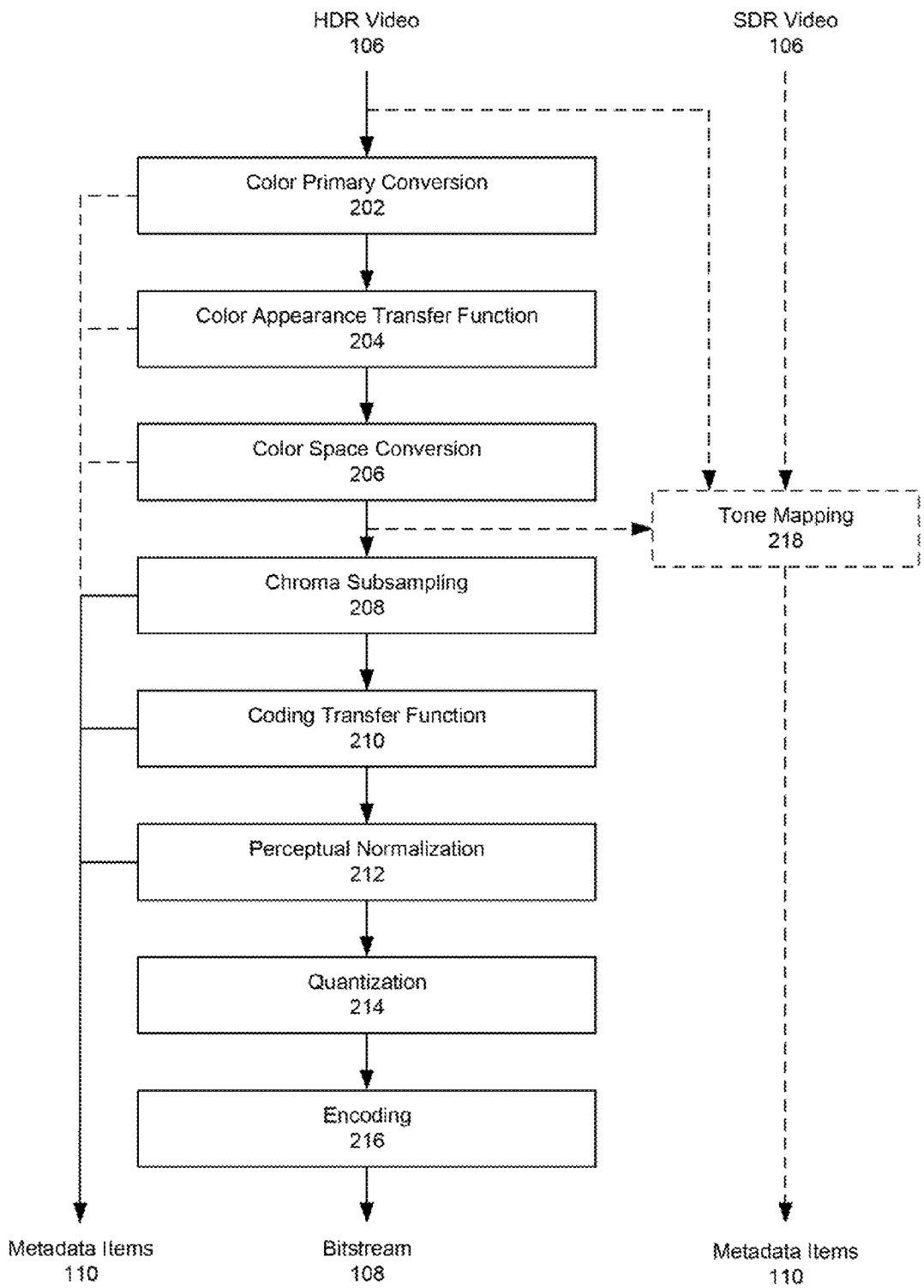
FIG. 2 depicts an exemplary process that an encoder can use to convert and encode HDR video using one or more pre-processing operations.

By way of a non-limiting example, FIG. 2 depicts an exemplary process that an encoder 100 can use to convert and encode HDR video 106.

At step 202, the encoder 100 can perform color primary conversions. A color primary conversion operation can convert values into a different color primary. In some embodiments a color primary conversion can convert values between an RGB color primary such as the RGB color primaries defined in Recommendation ITU-R BT.709 and Recommendation ITU-R BT.2020, herein incorporated by reference, an LMS color primary, and/or an XYZ color primary. By way of a non-limiting example, the encoder 100 can perform color primary conversion to convert RGB values with primary values in one primary set to values in a different primary set.

At step 204, the encoder 100 can use a color appearance transfer function on color values. A color appearance transfer function can redistribute linear color values with a non-linear curve, such that perceptible differences between similar colors can be preserved during encoding. By way of a non-limiting example, similar values in a linear domain can be quantized by the encoder into the same value, but when those similar values are non-linearly redistributed, they can be less likely to be quantized into the same value. As such, a color appearance transfer function can make transitions between similar colors appear more uniform. A color appearance transfer function can be a gamma function, a PQ (perceptual quantizer) transfer function such as the inverse of the transfer function defined in SMPTE ST.2084, hereby incorporated by reference, or other non-linear functions.

At step 206, the encoder 100 can perform color space transformation operations. A color space transformation operation can convert a primary color component from one color space to another color space, such as IPT or YCbCr. By way of a non-limiting example, RGB values following a color appearance transfer function can be converted to YCbCr values.

At step 208, the encoder 100 can perform chroma subsampling to decrease the number of samples devoted to chroma components. By way of a non-limiting example, YCbCr values can have a 4:4:4 resolution in which the Y luma component, the Cb chroma component, and the Cr chroma component are described with the same number of samples. The encoder 100 can perform a chroma subsampling operation to convert 4:4:4 values to 4:2:0 values that decrease the number of samples devoted to the Cb and Cr chroma components, as the human eye is generally less sensitive to those components than to the Y luma component.

At step 210, the encoder 100 can perform coding transfer function operations. A coding transfer function operation can non-linearly redistribute values on a different scale, such as with transfer functions based on Weber's Law, Steven's Power Law, or other parametric or adaptive transfer functions. By way of a non-limiting example, a coding transfer function can be derived from Steven's Power Law using a gamma exponent selected based on content of the video 106, intended maximum and minimum sample values, maximum brightness or luminance contrast, and/or a quantization step size.

At step 212, the encoder 100 can perform perceptual normalization operations. A perceptual normalization operation can scale color values, based on psychophysical masking effects of the Human Visual System (HVS), to create a perceptually uniform output signal across all color channels. In some embodiments operations such as color primary conversions, color appearance transfer functions, color space transformation, and coding transfer functions can operate on a pixel by pixel basis, while perform perceptual normalization operations can consider pixels relative to surrounding pixels temporally and/or spatially to perceptually adjust values relative to each other. As such, perceptual normalization operations can adjust the relative intensities and contrast between color values, as humans can perceive colors differently when seen alone compared to when seen together.

At step 214, the encoder 100 can quantize the color values into a fixed-point value with a given bit depth. By way of a non-limiting example, when the color values in the HDR video 106 were represented with 16-bit values, the encoder 100 can quantize them into a lower bit depth, such as 10-bit values.

At step 216, the encoder 100 can encode the color values into a bitstream 108. As described above, the encoder 100 can be configured to generate the bitstream 108 according to a video coding format and/or compression scheme, such as HEVC, AVC, or MPEG-2.

In alternate embodiments, any or all of the pre-processing operations shown in FIG. 2 prior to step 216 can be absent or be performed in a different order. By way of a non-limiting example, in some embodiments the encoder 100 can perform chroma subsampling from a 4:4:4 format to a 4:2:0 format following quantization at step 214 rather than earlier in the process during step 208. By way of another non-limiting example, the perceptual normalization of step 212 can be absent in some embodiments.

The bitstream 108 generated by the encoder 100 can be delivered to decoders 102 along with one or more metadata items 110. Metadata items 110 can indicate information about how the encoder 100 performed some or all of the operations shown in FIG. 2, such as parameters or other information about color primary conversion, color appearance transfer function, color space conversion, coding transfer function, perceptual normalization, and/or chroma subsampling operations. As will be described below, a decoder 102 can use these metadata items 110 to identify and perform inverse operations that substantially reverse the encoder's operations to generate a reconstruction of the HDR video 106. In some embodiments metadata items 110 can be encoded into or otherwise included with the bitstream 108, while in other embodiments the metadata items 110 and bitstream 108 can be separately delivered to decoders 102. Metadata items 110 can also be used by encoders 100 and/or decoders 102 when reconstructing encoded reference pictures during encoding or decoding.

In some embodiments, some or all of the operations taken by the encoder 100 can be adjusted based on the content of the video 106, such as performing operations with different parameters for different scenes, different frames, and/or different regions of the same frame. As such, metadata items 110 can be encoded that indicate information about the pre-processing operations taken for each scene, frame, and/or frame region.

In some embodiments the pre-processing operations shown in FIG. 2 can convert original HDR values into SDR values, such that the bitstream 108 generated by the encoder 100 contains encoded SDR values. By way of a non-limiting example, the pre-processing operations of FIG. 2 can convert HDR color values into 10-bit 4:2:0 SDR compatible color values. In these embodiments a decoder 102 for an SDR display can decode the SDR values from the bitstream 108 and output them to an SDR display 104 without performing inverse post-processing operations, while a decoder 102 for an HDR display can decode the bitstream 108, identify inverse operations from the metadata items 110, and perform the inverse post-processing operations to convert the decoded SDR values into HDR values.

In other embodiments the bitstream 108 generated by the encoder 100 after the operations shown in FIG. 2 can contain values that may not be suitable to present on an SDR display without additional processing following decoding. In some of these embodiments, the encoder 100 can at step 218 review converted values following step 206 against original values from the HDR video 106 and/or SDR values from a separate instance of the video 106 mastered in SDR to determine one or more tone mapping operations that a decoder 102 can use to convert values decoded from the bitstream 108 into values suitable for display on an SDR display 104. Information about identified tone mapping operations, such as lookup tables or transfer functions, can be provided to decoders 102 in metadata items 110.

As described above, a decoder 102 can use metadata items 110 to identify post-processing operations that it can use following decoding a bitstream 108 to substantially reverse operations taken by the encoder 100 prior to encoding. However, in some embodiments one or more post-processing operations at the decoder 102 can be configured to process values in a particular format, such as values in a particular bit depth, a particular color space, and/or that have been adjusted with a particular transfer function. As such, the decoder 102 can perform one or more HDR adaptation operations to convert values into the format expected by later post-processing operations.

By way of a non-limiting example, a decoder 102 can decode values from a bitstream 108, inversely quantize them into a higher bit depth, and then perform an inverse perceptual normalization operation identified by metadata items 110. In this example, the values after the inverse perceptual normalization operation can be 10-bit 4:2:0 XYZ values that have been adjusted with a PQ function. However, the decoder 102 can be configured to further process those values with additional post-processing operations, such as a chroma upsampling operation, inverse color space conversion operation, inverse color appearance transfer function, and inverse color primary conversion operation. When later post-processing operations expect values to be in a different format than is produced by earlier operations, the decoder 102 can perform one or more HDR adaptation operations to convert the values into the expected format, such as converting the 10-bit 4:2:0 XYZ values adjusted with a PQ function into 16-bit 4:2:0 YCbCr values adjusted with a gamma function. After converted the values with the HDR adaptation operations into the expected format, the decoder 102 can continue with further post-processing operations to reconstruct HDR video.

Figure 3:
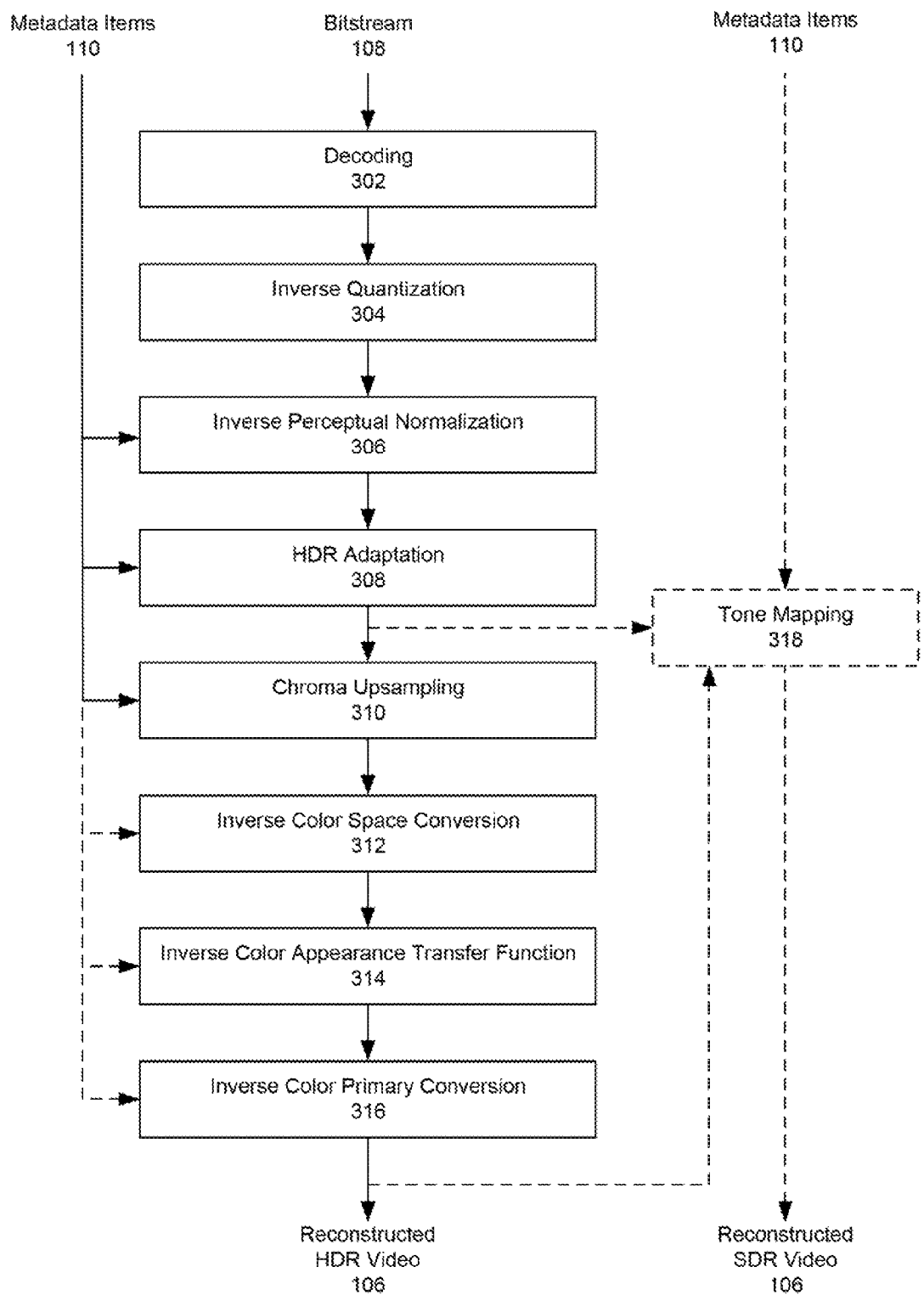
FIG. 3 depicts an exemplary process that a decoder can use to decode a bitstream and reconstruct HDR video, using one or more HDR adaptation operations.

By way of a non-limiting example, FIG. 3 depicts an exemplary process that a decoder 102 can use to decode a bitstream 108 and reconstruct HDR video 106, using one or more HDR adaptation operations.

At step 302, the decoder 102 can decode the bitstream 108. As described above, the decoder 102 can be configured to decode the bitstream 108 according to a video coding format and/or compression scheme, such as HEVC, AVC, or MPEG-2.

At step 304, the decoder 102 can inversely quantize the color values into a different bit depth. By way of a non-limiting example, when the color values decoded from the bitstream 108 are 10-bit values, the decoder 102 can inversely quantize them into a higher bit depth, such as 16-bit values or floating point values.

At step 306, the decoder 102 can perform inverse perceptual normalization operations. An inverse perceptual normalization operation can substantially reverse perceptual normalization operations taken by the encoder 100 in step 212. Inverse perceptual normalization operations can be identified by metadata items 110, such as a set of three one dimensional lookup tables, each of which can be used to convert one element of a ternary set of values.

At step 308, the decoder 102 can perform one or more HDR adaptation operations. As described herein, HDR adaptation operations can convert values output by earlier operations into a format expected by later post-processing operations, such as the operations in this example shown in steps 310, 312, 314, and 316.

At step 310, the decoder 102 can perform chroma upsampling to increase the number of samples devoted to chroma components. By way of a non-limiting example, the decoder 102 can perform a chroma upsampling operation to convert 4:2:0 values to 4:4:4 values.

At step 312, the decoder 102 can perform inverse color space transformation operations. An inverse color space transformation operation can convert values into a different color space, such as converting values between the IPT, and/or YCbCr color spaces. In some embodiments an inverse color space transformation operation can be identified by metadata items 110, such that the decoder 102 can substantially reverse a color space transformation operation taken by an encoder 100 at step 206. In other embodiments, the decoder's inverse color space transformation operation can be a fixed operation that expects input values to be in a specific input color space and converts them to another specific output color space. In these embodiments, an HDR adaptation operation during step 308 can convert values into the input color space expected by the decoder's fixed inverse color space transformation operation.

At step 314, the decoder 102 can use an inverse color appearance transfer function on color values. An inverse color appearance transfer function can be an inverse gamma function, an inverse PQ function, or other non-linear functions. By way of non-limiting examples, an inverse gamma function can reverse a forward gamma function performed at an encoder 100, while an inverse PQ function can be a forward transfer function such as the PQ function defined in SMPTE ST.2084 that undoes a reverse PQ function performed at an encoder 100. In some embodiments an inverse color appearance transfer function can be identified by metadata items 110, such that the decoder 102 can substantially reverse a color appearance transfer function used by an encoder 100 at step 204. In other embodiments, the decoder's inverse color appearance transfer function can be a fixed function that expects to operate on values that have previously been adjusted by a specific transfer function, such as a gamma function or PQ function. In these embodiments, an HDR adaptation operation during step 308 can convert incoming values such that the decoder's fixed inverse color appearance transfer function can operate as expected on the values. By way of a non-limiting example, when the incoming values have been adjusted by a gamma function but the fixed inverse color appearance transfer function is configured to reverse a PQ function, the HDR adaptation block can convert the gamma-adjusted values into PQ-adjusted values such that the fixed inverse color appearance transfer function operates appropriately on the PQ-adjusted values.

At step 316, the decoder 102 can perform inverse color primary conversion operations. An inverse color primary conversion operation can convert values into a different color primary. In some embodiments an inverse color primary conversion operation can be identified by metadata items 110, such that the decoder 102 can substantially reverse a color primary conversion operation taken by an encoder 100 at step 202. In other embodiments, the decoder's inverse color primary conversion operation can be a fixed operation that expects input values to be in a specific input color primary and converts them to another specific output color primary. In these embodiments, an HDR adaptation operation during step 308 can convert values into the input color primary expected by the decoder's fixed inverse color primary conversion operation.

In alternate embodiments, any or all of the post-processing operations shown in FIG. 3 after step 302 can be absent or be performed in a different order. By way of a non-limiting example, in some embodiments the encoder 100 can perform chroma upsampling from a 4:2:0 format to a 4:4:4 format before step 304 prior to inverse quantitation rather than later in the process during step 310. By way of another non-limiting example, the inverse perceptual normalization of step 306 can be absent in some embodiments.

The operations shown in FIG. 3 can substantially reconstruct the HDR video 106 for display on an HDR display 104.

In some embodiments in which the encoder's pre-processing operations prior to encoding the bitstream 108 convert original HDR values into SDR values, a decoder 102 for an SDR display 104 can perform decoding operations at step 302 and then output those decoded SDR values for display on an SDR display 104, without performing later post-processing operations such as those shown in step 304 to step 316.

In other embodiments in which values decoded from the bitstream 108 are not suitable for display on SDR displays 104 but in which the encoder 100 identified tone mapping operations at step 218 and provided metadata items 110 about the tone mapping operations, at step 318 the decoder 102 can perform the identified tone mapping operations on decoded and/or processed values to convert them from HDR values to SDR values that can be presented by an SDR display 104. By way of a non-limiting example, the tone mapping operations performed in step 318 can operate on HDR values decoded from the bitstream 108, such as converted HDR values produced by HDR adaptation operations in step 308, to convert them into SDR values. In some embodiments, the tone mapping operations performed in step 318 can also be partially based on values in the reconstructed HDR video 106 after step 316.

As described above, HDR adaptation operations at a decoder 102 can convert decoded values into a specific format expected by later post-processing operations at the decoder 102 and/or by the display 104. While in some embodiments a decoder 102 can adapt inverse color space conversions, inverse color appearance transfer functions, and/or inverse color primary conversions based on metadata items 110 as described above, in other embodiments such post-processing operations can be fixed and can expect values in a particular format. The HDR adaptation operations can convert values into the format expected by such fixed post-processing operations.

By way of a first non-limiting example, a decoder's inverse perceptual normalization operations can convert values based on a three one-dimensional lookup tables identified by metadata items, its inverse color space conversion operation can use a fixed identity matrix, its inverse color appearance transfer function can be a fixed inverse PQ function, and its inverse color primary conversion operations use a fixed XYZ to RGB color primary conversion matrix. In some embodiments, values produced by the inverse perceptual normalization operations can also be chroma upsampled from 4:2:0 to 4:4:4 at step 310 prior to the fixed operations.

Accordingly, in this example the HDR adaptation operations can convert values found from the three one-dimensional lookup tables into 10-bit 4:2:0 XYZ values adjusted by a PQ function. As such, the values output by the HDR adaptation operations can then be chroma upsampled to 4:4:4 values, processed by the fixed inverse PQ function, and then be converted from XYZ values to RGB values using the fixed color primary conversion operation.

By way of a similar non-limiting example, when the decoder's inverse color space conversion operation uses a fixed identity matrix, its inverse color appearance transfer function is a fixed inverse PQ function, and its inverse color primary conversion operations uses a fixed conversion matrix to convert YCbCr values to R'G'B' components that have been transformed by the PQ function, the decoder's HDR adaptation operations can convert values found by inverse perceptual normalization operations into 10-bit 4:2:0 YCbCr values adjusted by a PQ function.

In general, the format of color values before and after HDR adaptation operations can be represented as $ABC_{TF\_N}$, where "ABC" indicates the color space of the color values, "TF" indicates the transfer function the decoder 102 expects to reverse with an inverse color appearance transfer function, and "N" indicates the bit depth of the color values. The color space indicated by "ABC" can be YUV, YCbCr, XYZ, YDxDz, IPT, RGB, YFbFr, YCbCr Constant Luminance, Y"u"v", or any other color space. The transfer function indicated by "TF" can be a gamma function, a PQ function, or any other transfer function. The bit depth can be 8 bits, 10 bits, 12 bits, 14 bits, 16 bits, 24 bits, 32 bits, or any other number of bits.

As such, the HDR adaptation operations can convert color values between an input $ABC_{TF\_N}$ format and a desired output $ABC_{TF\_N}$ format, such as between converting between formats including: $XYZ_{PQ\_12}$; $XYZ_{PQ\_14}$; $XYZ_{PQ\_16}$; $YDxDz_{PQ\_10}$; $YDxDz_{PQ\_12}$; $YDxDz_{PQ\_14}$; $YDxDz_{PQ\_16}$; $IPT_{PQ\_10}$; $IPT_{PQ\_12}$; $IPT_{PQ\_14}$; $IPT_{PQ\_16}$; $XYZ_{Gamma\_10}$; $XYZ_{Gamma\_12}$; $XYZ_{Gamma\_14}$; $XYZ_{Gamma\_16}$; $YCbCr_{PQ\_10}$; $YCbCr_{PQ\_12}$; $YCbCr_{PQ\_14}$; $YCbCr_{PQ\_16}$; $RGB_{PQ\_10}$; $RGB_{PQ\_12}$; $RGB_{PQ\_14}$; $RGB_{PQ\_16}$; $YCbCr_{Gamma\_10}$; $YCbCr_{Gamma\_12}$; $YCbCr_{Gamma\_14}$; $YCbCr_{Gamma\_16}$; $RGB_{Gamma\_10}$; $RGB_{Gamma\_12}$; $RGB_{Gamma\_14}$; $RGB_{Gamma\_16}$; and/or any other format. HDR adaptation operations can accordingly include color space adaptation operations 400, transfer function adaptation operations 500, and/or bit depth adaptation operations 600, as described below.

Figure 4:
FIG. 4 depicts a color space adaptation operation.

FIG. 4 depicts a color space adaptation operation 400. A color space adaptation operation 400 can be an HDR adaptation operation that converts values from an input color space to an output color space. In some embodiments, the input and/or output color space can be either constant luminance (CL) or non-constant luminance (NCL).

In some embodiments the color space adaptation operation 400 can first convert values from the input color space into a linear set of color primaries, such as an RGB BT.2020 or linear XYZ color primary. The color space adaptation operation 400 can then convert the intermediate linear domain color space values to the desired output color space.

By way of a non-limiting example, when the input color space is a YCbCr NCL luminance color space and the desired output color space is a $Y_{PQ}Cb_{PQ}Cr_{PQ}$ NCL color space where values have been adjusted by a PQ function, the color space adaptation operation 400 can convert the input Y luma component into a PQ Y luma component with a transfer function $TF_Y$, such that $Y_{PQ}=TF_Y(Y)$.

The color space adaptation operation 400 can also convert the three input YCbCr components into a blue (B) value using the formula B=a1*Y+a2*Cb+a3*Cr, followed by converting the B value into a PQ B value using a mapping function $TF_B$, such that $B_{PQ}=TF_B(B)$.

Similarly, the color space adaptation operation 400 can also convert the three input YCbCr components into a red (R) value using the formula R=a4*Y+a5*Cb+a6*Cr, followed by converting the R value into a PQ R value using a mapping function $TF_R$, such that $R_{PQ}=TF_R(R)$.

The color space adaptation operation 400 can then use the PQ Y, PQ B, and PQ R values to find PQ Cb and PQ Cr values, using transfer functions $TF_{Cb}$ and $TF_{Cr}$ respectively, such that $Cb_{PQ}=TF_{Cb}(Y_{PQ}, B_{PQ}, R_{PQ})$ and $Cr_{PQ}=TF_{Cr}(Y_{PQ}, B_{PQ}, R_{PQ})$. $TF_{Cb}$ and $TF_{Cr}$ can be defined as follows:

$$Cb_{PQ}=TF_{Cb}(Y_{PQ},B_{PQ},R_{PQ})=a1_{PQ}*Y_{PQ}-a2_{PQ}*B_{PQ}+a3_{PQ}*R_{PQ}$$

$$Cr_{PQ}=TF_{Cr}(Y_{PQ},B_{PQ},R_{PQ})=a4_{PQ}*Y_{PQ}-a5_{PQ}*B_{PQ}+a6_{PQ}*R_{PQ}$$

In some embodiments functions such as $TF_Y$, $TF_B$, $TF_R$, $TF_{Cb}$, and $TF_{Cr}$ can be fixed mapping functions or adaptive mapping functions that can be altered depending on parameters communicated through metadata items 110 or that are otherwise known to the decoder 102. By way of a non-limiting example, in some embodiments a1, a2, a3, a4, a5, and/or a6 can have default values known to encoders 100 and decoders 102 based on a standard such as Recommendation ITU-R BT.2020 or SMPTE ST.2084, although if the encoder 100 modifies their value during encoding the encoder 100 can communicate the changed values to decoders 102 using metadata items 110. In other embodiments the decoder 102 can used fixed or adaptive lookup tables for $TF_Y$, $TF_B$, $TF_R$, $TF_{Cb}$, and $TF_{Cr}$ to convert values.

In alternate embodiments, a color space adaptation operation 400 can convert values directly from the input color space to the output color space, without converting them to an intermediate linear domain color space.

In some of these direct conversion embodiments, input values represented with a triplet signal with three components can be converted into three components of an output triplet signal using three functions as follows, where Input_Comp_1, Input_Comp_2, and Input_Comp_3 represent the components of the color values in the input color space and Output_Comp_1, Output_Comp_2, and Output_Comp_3 represent the components of the color values in the input color space:

Output_Comp_1=$TF_{Output\_Comp\_1}$(Input_Comp_1, Input_Comp_2,Input_Comp_3)

Output_Comp_2=$TF_{Output\_Comp\_2}$(Input_Comp_1, Input_Comp_2,Input_Comp_3)

Output_Comp_3=$TF_{Output\_Comp\_3}$(Input_Comp_1, Input_Comp_2,Input_Comp_3)

By way of a non-limiting example, the $TF_{Output\_Comp\_1}$, $TF_{Output\_Comp\_2}$, and $TF_{Output\_Comp\_3}$ functions can operate on the three components of input BT.2020 YCbCr values to respectively generate an output PQ Y component, an output PQ Cb component, and an output PQ Cr component.

In some embodiments $TF_{Output\_Comp\_1}$, $TF_{Output\_Comp\_2}$, and $TF_{Output\_Comp\_3}$ can be fixed mapping functions or adaptive mapping functions that can be altered depending on parameters communicated through metadata items 110 or that are otherwise known to the decoder 102. In other embodiments the decoder 102 can used fixed or adaptive lookup tables to directly convert between values in the input color space and output color space.

Figure 5:
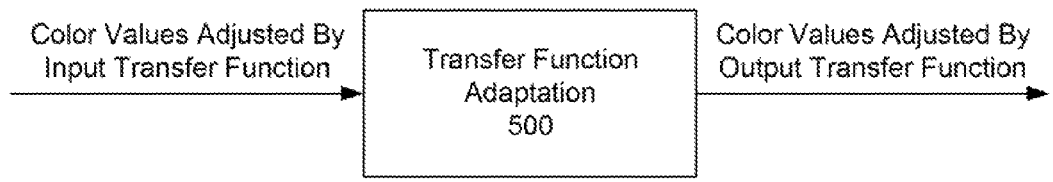
FIG. 5 depicts a transfer function adaptation operation.

FIG. 5 depicts a transfer function adaptation operation 500. As described above, operations such as an inverse color appearance transfer function can be configured to reverse the effects of a particular transfer function on color values. As such, a transfer function adaptation operation 500 can be an HDR adaptation operation that converts values from being adjusted based on an input transfer function to being adjusted based on an output transfer function. The input and/or output transfer functions can be linear or non-linear transfer functions, such as a gamma function, a PQ function, or any other function. The output transfer function can be a transfer function expected to be reversed by a later inverse transfer function at the decoder 102, such as the inverse color appearance transfer function.

In some embodiments the transfer function adaptation operation 500 can be fixed mapping functions or adaptive mapping functions that can be altered depending on parameters communicated through metadata items 110 or that are otherwise known to the decoder 102. In other embodiments the decoder 102 can used fixed or adaptive lookup tables to directly convert between values adjusted by the input transfer function and values adjusted by the output transfer function.

By way of a non-limiting example, when metadata items 110 generated by the encoder 100 indicate parameters for an adaptive color appearance transfer function on a scene-by-scene, frame-by-frame, or frame region basis for an adaptive inverse color appearance transfer function, but the decoder 102 uses a fixed inverse color appearance transfer function, the decoder 102 can use those metadata items 110 in a transfer function adaptation operation 500 to convert values based on the parameters for that scene, frame, or frame region, such that the transfer function adjustment can be appropriately reversed by the fixed inverse color appearance transfer function.

In some embodiments, when the decoder 102 has a fixed number of possible inverse color appearance transfer functions it can use, the decoder 102 can have a corresponding number of fixed lookup tables, one for each possible inverse transfer function. As such, when there are X possible input values and M possible inverse color appearance transfer functions at the decoder 102, given an input value x (0≤x≤X) and an index m for a particular inverse color appearance transfer functions (0≤m≤M), the decoder 102 can use a lookup table LUT to find an output value Y at LUT[x][m]. In some embodiments similar fixed lookup tables can also be provided for other components, such as Cb and Cr components. In some of these embodiments, the values of x can be based on a combination of one or more of the Y, Cb, and Cr components.

In other embodiments, a lookup table can be generated adaptively from information received in metadata items 110. By way of a non-limiting example, metadata items 110 can define a multiple piece-wise segment curve, such as a multiple piece-wise polynomial curve with order of two, or any other order. In this example, the decoder 102 can determine a transfer function from that curve and generate a corresponding lookup table to use in the transfer function adaptation operation 500 based on parameters of each curve segment.

Figure 6:
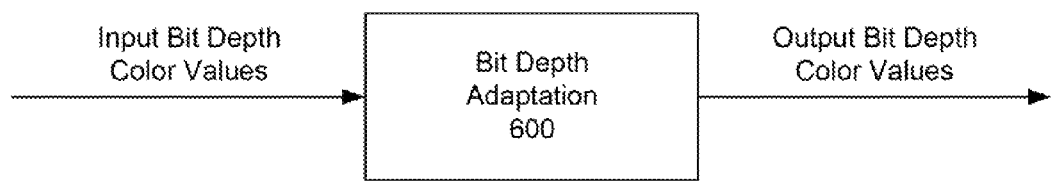
FIG. 6 depicts a bit depth adaptation operation.

FIG. 6 depicts a bit depth adaptation operation 600. In some embodiments decoded values can be represented in a different bit depth than is expected by later operations. By way of a non-limiting example, an operation at the decoder such as an inverse perceptual normalization operations can use one or more transfer functions, three dimensional lookup tables, or a set of three one dimensional lookup tables that produce values at any computational accuracy or that are represented at any bit depth. By way of a non-limiting example, an inverse perceptual normalization operation can produce floating point values represented with 10 bits, 16 bits, 24 bits, 32 bits, or any other number of bits. However, later operations can expect values at a specific bit depth, such as 8 bits or 10 bits. As such, the bit depth adaptation operation 600 can convert the values from an input bit depth to an output bit depth.

While HDR adaptation operations are described above as being performed by a decoder 102 to convert values into a format expected by later post-processing operations, similar HDR adaptation operations can be performed by an encoder 100 at a step prior to later pre-processing operations to convert values into a format expected by those later operations. By way of a non-limiting example, when an encoder's color primary conversion, color appearance transfer function, color space conversion, and/or chroma subsampling operations produce values in a format that is different than expected by later pre-processing operations, the encoder 100 can perform one or more HDR adaptation operations to convert their color space, transfer function adjustment, bit depth, or any other attribute.

Figure 7:
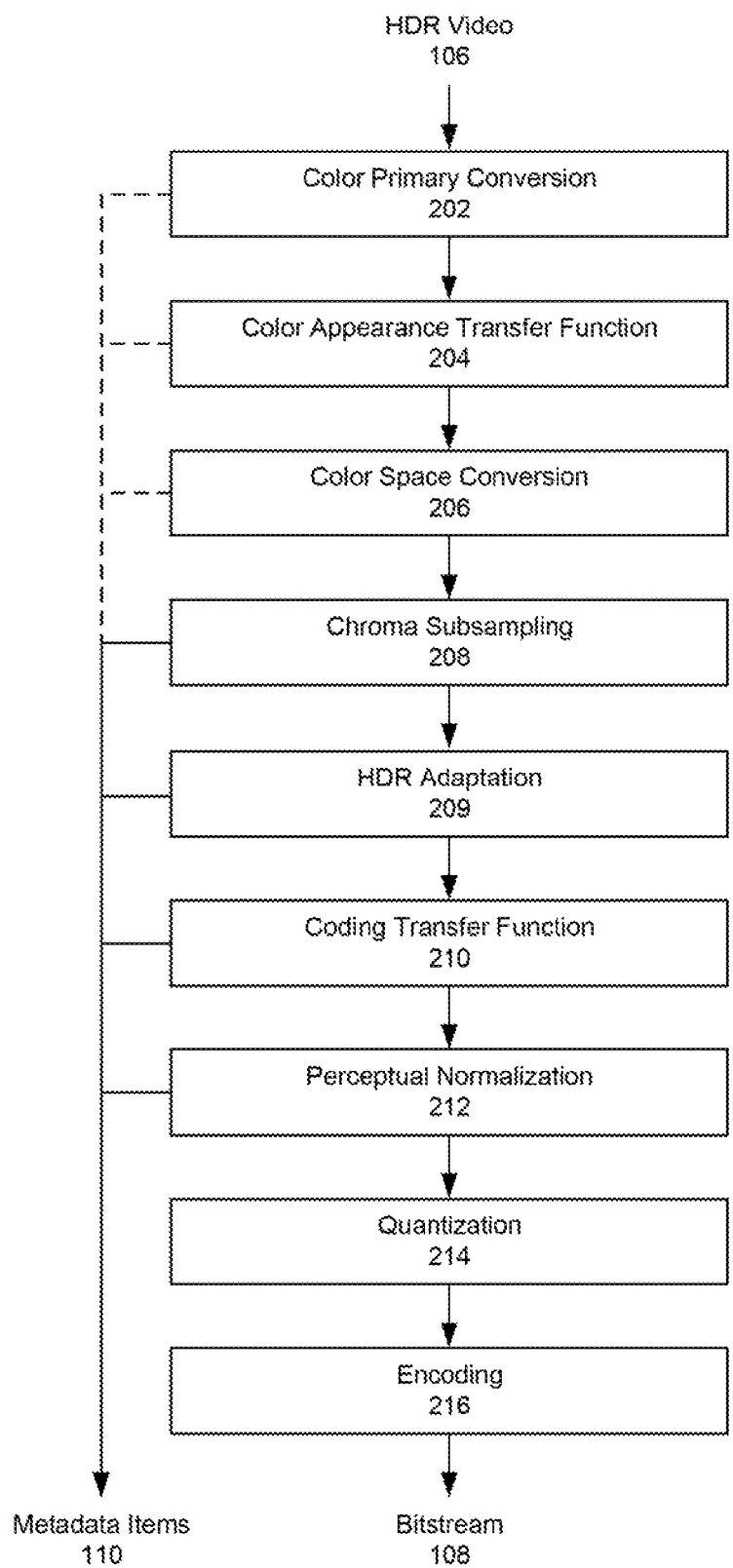
FIG. 7 depicts an alternate embodiment of an encoding process that uses one or more HDR adaptation operations.

By way of a non-limiting example, FIG. 7 depicts an alternate embodiment of the encoding steps shown in FIG. 2, with step 209 taking place between chroma subsampling at step 208 and the coding transfer function at step 210. At step 209, the encoder 100 can perform one or more HDR adaptation operations such as those described with respect to FIGS. 4-6. The HDR adaptation operations performed during step 209 in this exemplary embodiment can convert values from a format produced via steps 202 through 208 into a format expected by later steps such as steps 210, 212, 214, and/or 216. In alternate embodiments, HDR adaptation operations can be performed by the encoder 100 at any other step.

Although the present invention has been described above with particularity, this was merely to teach one of ordinary skill in the art how to make and use the invention. Many additional modifications will fall within the scope of the invention, as that scope is defined by the following claims.

The invention claimed is:
1. A method of decoding a bitstream, comprising:
receiving a bitstream at a decoder;
decoding said bitstream with said decoder into color values and metadata items indicating information about adaptive post-processing operations to be performed by said decoder;
performing, with said decoder, one or more high dynamic range (HDR) adaptation operations on said color values based on said metadata items; and
performing, with said decoder, one or more fixed post-processing operations to reconstruct an HDR video from said color values,
wherein said one or more HDR adaptation operations convert said color values into a format expected by said one or more fixed post-processing operations,
wherein one of said fixed post-processing operations is an inverse color space conversion operation and one of said HDR adaptation operations is a color space adaptation operation that converts said color values from an input color space to an output color space expected by said inverse color space conversion operation, wherein said color space adaptation operation first converts at least some components of said color values from said input color space into an intermediate linear color space and then from said intermediate linear color space into said output color space, wherein said input color space is a YCbCr color space and said output color space is a perceptually quantized (PQ) YCbCr color space, and said decoder:

converts the Y luma component from said YCbCr color space to a PQ Y luma component for said PQ YCbCr color space using a luma conversion operation, converts the Y luma component, the Cb chroma component, and the Cr chroma component from said YCbCr color space to an intermediate PQ blue component using a blue conversion operation, converts the Y luma component, the Cb chroma component, and the Cr chroma component from said YCbCr color space to an intermediate PQ red component using a red conversion operation, converts the PQ Y luma component, the intermediate PQ blue component, and the intermediate PQ red component into a PQ Cb chroma component using a Cb conversion operation, and converts the PQ Y luma component, the intermediate PQ blue component, and the intermediate PQ red component into a PQ Cr chroma component using a Cr conversion operation, wherein said luma conversion operation, said blue conversion operation, said red conversion operation, said Cb conversion operation, and said Cr conversion operation are defined with mapping functions or lookup tables.

2. The method of claim 1, wherein one of said fixed post-processing operations is an inverse color space conversion operation and one of said HDR adaptation operations is a color space adaptation operation that converts said color values from an input color space to an output color space expected by said inverse color space conversion operation.

3. The method of claim 2, wherein said color space adaptation operation converts said color values based on a fixed lookup table or a fixed mapping function.

4. The method of claim 2, wherein said color space adaptation operation converts said color values based on an adaptive lookup table or an adaptive mapping function determined from parameters in said metadata items.

5. The method of claim 1, wherein one of said input color space and said output color space is a non-constant luminance color space and the other one of said input color space and said output color space is a constant luminance color space.

6. The method of claim 1, wherein one of said fixed post-processing operations is an inverse color appearance transfer function and one of said HDR adaptation operations is a transfer function adaptation operation that converts said color values from being adjusted by an input transfer function to being adjusted by an output transfer function as expected by inverse color appearance transfer function.

7. The method of claim 6, wherein one of said input transfer function and said output transfer function is a gamma function and the other one of said input transfer function and said output transfer function is a perceptual quantizer (PQ) function.

8. The method of claim 6, wherein said transfer function adaptation operation converts said color values based on a fixed lookup table or a fixed mapping function.

9. The method of claim 8, wherein said decoder has a fixed lookup table for each possible inverse color appearance transfer function that can be used by said decoder, and said decoder converts a color value by finding an output color value on one of the fixed lookup tables identified using said metadata items.

10. The method of claim 6, wherein said transfer function adaptation operation converts said color values based on an adaptive lookup table or an adaptive mapping function determined from parameters in said metadata items.

11. The method of claim 10, wherein said metadata items define a multiple piece-wise segment curve and said decoder generates said adaptive lookup table using parameters that define each segment of said multiple piece-wise segment curve.

12. The method of claim 11, wherein said multiple piece-wise segment curve is a multiple piece-wise polynomial curve with an order of two.

13. The method of claim 1, wherein one of said HDR adaptation operations is a bit depth adaptation operation that converts said color values from an input bit depth to an output bit depth when said fixed post-processing operations expects said color values at said output bit depth.

14. The method of claim 1, wherein said metadata items indicate information about the encoder's pre-processing operations on a scene basis, a frame basis, or a frame region basis, such that said decoder changes said one or more HDR adaptation operations based on said metadata items for different scenes, frames, or frame regions.

* * * * *